No. 671,579. Patented Apr. 9, 1901.
C. H. BIDWELL.
SELF FEEDING MECHANISM FOR THRESHING MACHINES.
(Application filed June 12, 1899.)
(No Model.)

Witnesses:
Albert C. Bell.
Etha M. Smith

Inventor
Charles H. Bidwell
By his Atty. Wm H. Clerley.

THE NORRIS PETERS CO., PHOTO-LITHO., WASHINGTON, D. C.

UNITED STATES PATENT OFFICE.

CHARLES H. BIDWELL, OF MEDINA, NEW YORK.

SELF-FEEDING MECHANISM FOR THRESHING-MACHINES.

SPECIFICATION forming part of Letters Patent No. 671,579, dated April 9, 1901.

Application filed June 12, 1899. Serial No. 720,265. (No model.)

*To all whom it may concern:*

Be it known that I, CHARLES H. BIDWELL, a citizen of the United States, residing at Medina, in the county of Orleans and State of New York, have invented a new and Improved Self-Feeding Mechanism for Threshing-Machines, of which the following is a specification.

The object of my invention is the construction of a self-feeding mechanism adapted especially to bean-threshing machines.

I have found that the feeding mechanism usually employed in grain-threshing machines does not work satisfactorily in bean-threshers on account of the tendency of the bean-stalks, especially after remaining any length of time in the mow, to string and pass over the feeding mechanism in bunches. Another objection to the feeding mechanisms used in grain-threshing machines consists in the difficulty experienced in attempting to remove stone from the bean-stalks just before they enter the cylinder. The present methods of harvesting beans result in quite a quantity of stones being clogged up with the beans, and frequently they get upon the table and over the feeding mechanism into the cylinder, damaging the cylinder and concave. To overcome these difficulties, I have devised a self-feeding mechanism in which the presence of stones of any size sufficient to do serious damage gives an audible signal, and the operator may then readily tip the feeding mechanism in such a way that the stone will pass off from the feeding mechanism onto the ground without entering the cylinder.

Another advantage noted in connection with my self-feeding mechanism is the ready access afforded to the concave for the purpose of removing the same when desired.

Figure 1:
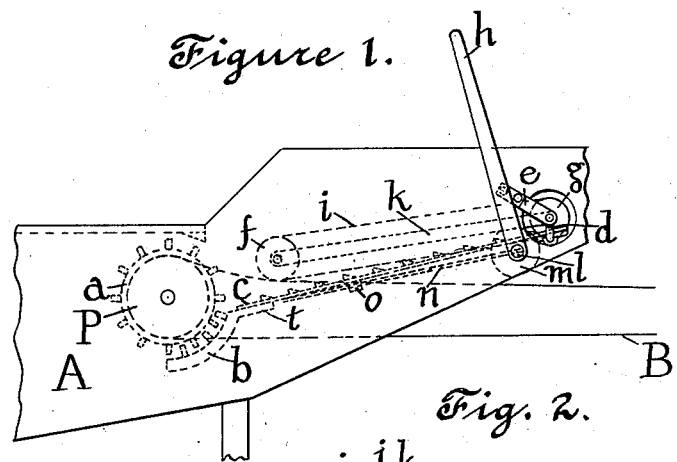
Figure 2:
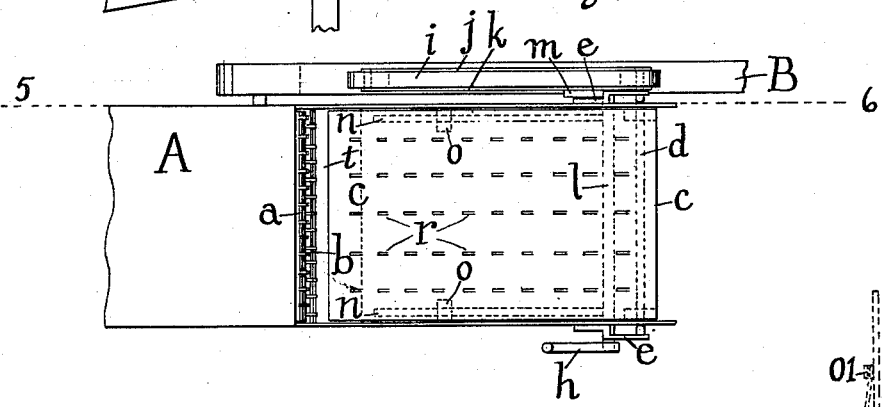
Figure 3:
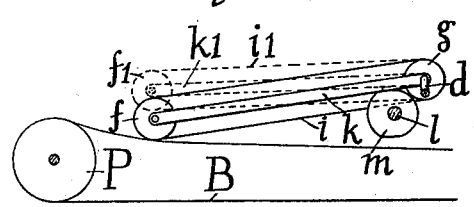
Figure 4:
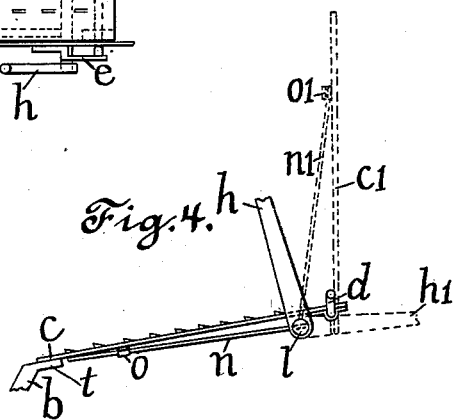

The accompanying drawings, illustrating my invention, are as follows:

Figure 1 is a side view of the rear end of a threshing-machine containing my improved feeding mechanism, such feeding mechanism and its attachments being shown in dotted lines, as well as also the cylinder and concave. Fig. 2 is a top view of the parts shown in Fig. 1. Fig. 3 is a vertical sectional view taken along the line 5 6 of Fig. 2 with all the parts below such line 5 6 in Fig. 2 removed. Fig. 4 illustrates in detail the construction of the tilting mechanism by means of which the self-feeder is inclined to the rearward in order to remove the stone from the stalks just before entering the cylinder.

Referring to the drawings, A represents the outside casing of a threshing-machine. The cylinder $a$ and the concave $b$ coöperating therewith are indicated in dotted lines in Fig. 1, while the exposed parts of such cylinder and concave are indicated in plan view in Fig. 2. This concave has formed on its upper end an extension projecting to the rear, which forms a support for the shaking-pan $c$, the rear end of which is supported in the double crank formed on the crank-shaft $d$. This crank-shaft $d$ revolves in suitable bearings $e$, thereby imparting to the pan $c$ a longitudinal shaking motion, while the rear end of such pan is caused to describe a complete circle by the rotation of the shaft $d$ over to the right. Suitable teeth $y$, formed or secured on the upper surface of this pan $c$, impart to the stalks, supplied thereto in the usual manner by means of a fork, a forward movement, causing them to advance at a uniform rate between the cylinder $a$ and the concave $b$. On the farther end of the shaft $d$ is seen a pulley $g$, to which rotation is imparted from a similar pulley $f$ by means of a band $i$. The pulleys $f$ and $g$ are held at a fixed distance from each other by means of the links $j$ and $k$, in the left-hand ends of which the bearings are formed for the shaft of the pulley $f$, while in the right-hand ends of these links $j$ and $k$ are formed bearings for the shaft $d$. These connecting-links $j$ and $k$ may be rigidly held at the proper distance apart and parallel to each other in any suitable manner. (Not shown.)

In the case A of the machine are formed suitable bearings for the shaft $l$, on the end of which toward the observer is rigidly secured the lever $h$. Projecting to the left from this shaft $l$ and rigidly secured thereto are seen the two arms $n$, each working freely through a suitable strap secured on the under side of the pan $c$ and near the left-hand end thereof. By the movement of this lever over to the right, causing it to occupy the position shown at $h'$ in dotted lines in Fig. 4, the pan $c$ is raised so as to occupy the position shown in dotted lines at $c'$, while the positions of the straps o and the arm n are also shown in dotted lines at o' and n', respectively. Secured on the end of this shaft l farthest from the observer is seen a cam m, arranged to engage the under surface of the connecting-link k. When the handle h occupies the normal position shown in full lines in Fig. 4, this cam m is nearly or quite free from the link k and allows the weight of the links j and k and that of the pulley f to fall upon the main driving-belt of the machine, working over the main pulley P, secured on the farther end of the shaft for the cylinder a. The weight of such parts resting upon this main driving-belt B causes sufficient friction between the belt i, encircling the pulleys f and g, and the belt B to drive such pulleys f g, thereby rotating the shaft d and reciprocating the pan c. Owing to the conformation of the cam m, but a slight movement of the handle h over to the right is required in order to cause the pulley f and the link k and belt i to occupy the position shown in dotted lines at f', k', and i', respectively, in Fig. 3, whereby the belt i, being lifted out of contact with the belt B, the rotation of the shaft d will cease. The conformation of this cam m is such also that upon a further movement of the handle h over to the right, causing it to occupy the position indicated in dotted lines in Fig. 4, the position of the pulley f and the link k and belt i will still be that indicated in dotted lines at f', k', and i', respectively.

The operation of my feeding mechanism is as follows: The bean-stalks, fed onto the pan c by a fork in the usual manner, are caused by the reciprocating motion of this pan c to be fed at a practically uniform rate in between the cylinder a and the concave b. The teeth r on the pan c and the reciprocating motion of such pan causes the stalks to be spread out in a nearly uniform layer when properly fed onto the pan c. I prefer to make this pan of sheet-iron in order that any stone which may be fed onto the pan with the stalks will produce a rattling noise, and thereby give indication of their presence. In such a case the person feeding the stalks upon the pan c will operate the lever h, moving the same to the right as far as may be necessary to cause such stones to drop off from the rear end of such pan and onto the ground. A suitable canvas may be spread on the ground to catch any beans that may pass off with the stones. In some cases a slight vibration of the handle h may be necessary to dislodge the stone, while the teeth r on the upper surface of the pan c will serve to prevent the bean-stalks from sliding off at the rear end of the pan.

When at any time it is desirable to get at the concave b, ready access is afforded thereto by moving the handle h clear over to the right to the position indicated in dotted lines h' in Fig. 4; but a slight motion only of this handle h over to the right is required to remove the belt i from contact with the belt b, thereby causing the rotation of the shaft d to cease.

What I claim is—

1. In a threshing-machine, a feeding mechanism consisting in a shaking-pan having teeth formed thereon, a handle or lever and connections between such handle and shaking-pan whereby such pan may be swung upward and to the rear on its operating crank-shaft by the movement of such handle, mechanism for operating such crank-shaft and connections between such handle and mechanism, whereby the operative connection between such crank-shaft and mechanism may be broken by the movement of such handle.

2. In a threshing-machine, a feeding mechanism consisting in a shaking-pan having teeth formed thereon, and arranged to swing upward and to the rear on its operating crank-shaft, a handle or lever and connections between such handle and shaking-pan whereby such pan may be swung upward and to the rear by the movement of such handle, mechanism for operating such crank-shaft and mechanism whereby the movement of such handle in swinging such pan upward and to the rear first disconnects such operating crank-shaft from such mechanism.

3. In a threshing-machine in combination with the feeding mechanism consisting in a shaking-pan having teeth formed thereon and arranged to give an audible signal of the presence of stone thereon, an operating crank-shaft for reciprocating such pan, mechanism for operating such crank-shaft, a handle or lever, connections between such handle and pan whereby, by the movement of such handle, such pan may at any point in its movement or throw, be swung upward and to the rear on such crank-shaft as the center of such motion, and connections between such handle and such mechanism whereby by the movement of such handle the operative connection between such mechanism and crank-shaft is first broken when such pan is swung upward and to the rear.

C. H. BIDWELL.

Witnesses:
ALBERT C. BELL,
ETHA M. SMITH.